(12) United States Patent
Gahleitner et al.

(10) Patent No.: US 8,450,416 B2
(45) Date of Patent: May 28, 2013

(54) FLEXIBLE POLYPROPYLENE WITH HIGH IMPACT STRENGTH

(75) Inventors: Markus Gahleitner, Neuhofen/Krems (AT); Doris Machl, Mettmach (AT); Katja Klimke, Linz (AT); Tung Pham, Linz (AT)

(73) Assignee: Borealis Technology Oy, Porvoo (FI)

( * ) Notice: Subject to any disclaimer, the term of this patent is extended or adjusted under 35 U.S.C. 154(b) by 215 days.

(21) Appl. No.: 12/937,282

(22) PCT Filed: Jan. 13, 2009

(86) PCT No.: PCT/EP2009/000149
§ 371 (c)(1),
(2), (4) Date: Oct. 14, 2010

(87) PCT Pub. No.: WO2009/124613
PCT Pub. Date: Oct. 15, 2009

(65) Prior Publication Data
US 2011/0196095 A1    Aug. 11, 2011

(30) Foreign Application Priority Data

Apr. 11, 2008 (EP) .................................. 08007217

(51) Int. Cl.
*C08L 53/00* (2006.01)
*C08L 43/04* (2006.01)
(52) U.S. Cl.
USPC ............ 525/92 G; 525/474; 525/209; 525/88
(58) Field of Classification Search
USPC ................... 525/474, 92 G, 209, 88
See application file for complete search history.

(56) References Cited

FOREIGN PATENT DOCUMENTS

| EP | 1323779 A1 | * | 7/2003 |
| EP | 1428854 A | | 6/2004 |
| EP | 1681315 A1 | * | 7/2006 |
| EP | 1834987 A | | 9/2007 |
| EP | 1939246 A | | 7/2008 |
| WO | 02/072693 A | | 9/2002 |
| WO | WO 2007/104458 | * | 9/2007 |

OTHER PUBLICATIONS

International Search Report and Written Opinion, PCT/EP2009/000149, Jun. 25, 2009.

* cited by examiner

*Primary Examiner* — Mark Kaucher
(74) *Attorney, Agent, or Firm* — Milbank Tweed Hadley & McCloy LLP

(57) ABSTRACT

The present invention is directed to a first polypropylene composition comprising a propylene copolymer as matrix phase (A) comprising a homo/random/block copolymer consisting of a) a propylene homopolymer (A1); b) a propylene random copolymer (A2); and c) an ethylene-propylene rubber (EPR) (A3) and a polyolefin (B) dispersed in the matrix phase (A), which comprises hydrolysable silicon-containing groups. The present invention is furthermore directed to a second polypropylene composition comprising a matrix phase (A) comprising a propylene homo- or copolymer with an impact strength at +23° C. of at least 40.0 $kJ/m^2$ in a Charpy notched test according to ISO 179-1eA:2000 and a polyolefin (B) dispersed in the matrix phase (A), which comprises hydrolysable silicon-containing groups. The invention is furthermore directed to a production process for the polypropylene compositions and an article made thereof.

16 Claims, 1 Drawing Sheet

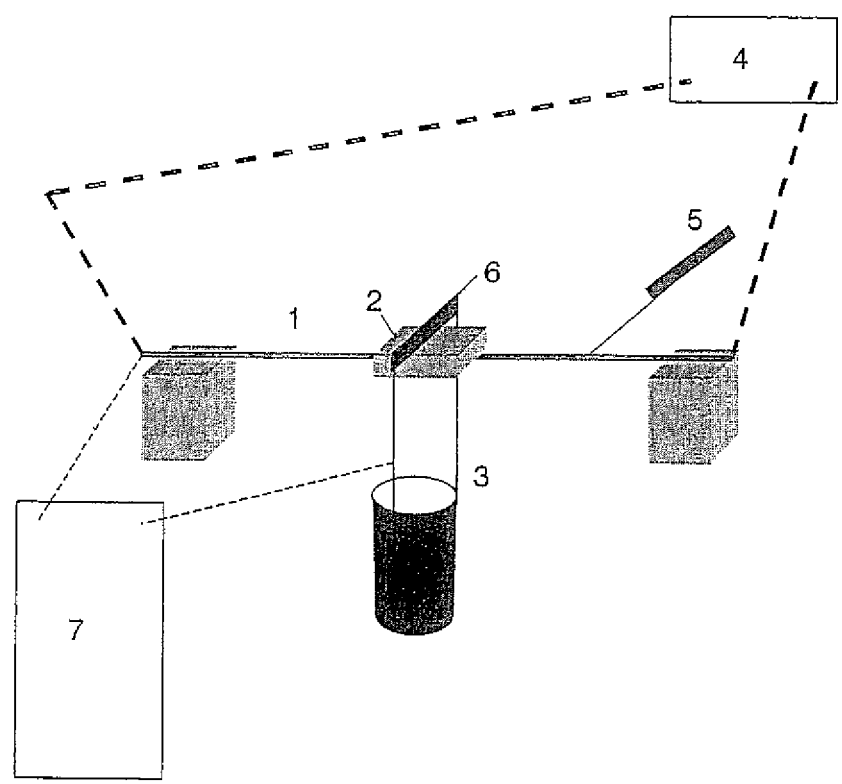

FLEXIBLE POLYPROPYLENE WITH HIGH IMPACT STRENGTH

This application is based on International Application PCT/EP2009/000149 filed Jan. 13, 2009, which claims priority to European Patent Application No. 08007217.6 filed on Apr. 11, 2008, the disclosures of which are herein incorporated by reference in their entireties.

The present invention relates to a polypropylene composition with a high impact strength comprising a selectively cross-linkable dispersed phase, a method for the production thereof, and theft use in different applications such as wires/cables, pipes and tubes.

Due to their chemical and thermal resistance as well as mechanical strength polypropylenes are used in different applications such as wires/cables, pipes and tubes.

U.S. Pat. No. 6,455,637 describes a heterophasic polypropylene composition, which is suitable for cross-linking reaction and wherein a silane-groups containing polyolefin is blended with a polypropylene. However, the described cross-linking reaction must be carried out under a humidity of 90 to 100% and at temperature of 85° C. These reaction conditions negatively influence the molecular structure of the polypropylene composition and thus the good mechanical properties of the composition and will accelerate physical and chemical ageing including post-crystallization. It is well known for these processes to limit the toughness of materials.

EP 1 834 987 describes a cross-linked polypropylene composition comprising a propylene homo- or copolymer (A) as matrix phase and a polyolefin (B). In all worked examples polyolefin (B) is a polyethylene which comprises hydrolysable silicon-containing groups, said polyolefin (B) is dispersed in the matrix phase. However, large amounts (≧25 wt. %) of the polyethylene are required to achieve an increase in impact strength at −20° C. This leads to a lower melting point of the polypropylene composition. In addition, the flexibility of the polymer can be improved.

Considering the above-mentioned disadvantages, the object of the present invention is to provide a polypropylene composition having a high impact strength at low temperatures (−20° C.) while retaining a high melting point and a high flexibility and wherein the cross-linking reaction of the polypropylene composition does not lead to negative side effects, which result in a degradative damage of the polypropylene composition and thus to a loss of the good mechanical properties of the polypropylene composition.

It has surprisingly been found that the object of the present invention can be achieved with a polypropylene composition which comprises a polyolefin (B) dispersed in the matrix phase (A). The matrix phase (A) is selected such that it has a comparable high impact strength at +23° C. in a Charpy notched test such as it is the case for a polypropylene matrix comprising a propylene homopolymer, a propylene random copolymer, and an ethylene-propylene rubber (EPR). If not otherwise mentioned the Charpy notched test was carried out as described in the experimental section below.

Therefore, the following two embodiments are provided by the current invention.

The first embodiment of the current invention is a polypropylene composition comprising
  a propylene copolymer as matrix phase (A) comprising a homo/random/block copolymer consisting of
    a. a propylene homopolymer (A1);
    b. a propylene random copolymer (A2); and
    c. an ethylene-propylene rubber (EPR) (A3)
  and
  a polyolefin (B) dispersed in the matrix phase (A), which comprises hydrolysable silicon-containing groups.

The second embodiment of the current invention is a polypropylene composition comprising
  a matrix phase (A) comprising a propylene homo- or copolymer with an impact strength at +23° C. of at least 40.0 kJ/m$^2$ in a Charpy notched test according to ISO 179-1eA:2000
  and
  a polyolefin (B) dispersed in the matrix phase (A), which comprises hydrolysable silicon-containing groups.

The inventive compositions described by the first and the second embodiment are characterized by a high impact strength, high flexibility and a high melting point. In addition, the optional selective cross-linking of the polyolefin (B) allows stabilizing of the phase morphology of the polypropylene composition without the above-mentioned negative side effects. The resulting inventive compositions are additionally characterized by an improved scratch resistance resulting from the continuous matrix phase as well as reduced shrinkage and improved surface quality resulting from the crosslinked polyolefin phase.

The term "polyolefin" denotes an olefin homo- or copolymer or a mixture of such olefin homo- or copolymers. The term "polypropylene" denotes a propylene homo- or copolymer or a mixture of such propylene homo- or copolymers. The term "polyethylene" denotes an ethylene homo- or copolymer or a mixture of such ethylene homo- or copolymers.

Preferably, in the composition according to the first embodiment the homo/random/block copolymer comprised in the matrix phase (A) has an impact strength at +23° C. of at least 40.0 kJ/m$^2$, more preferably of at least 45 kJ/m$^2$, even more preferably of at least 50 kJ/m$^2$, even more preferably of at least 55 kJ/m$^2$ and most preferably of 60 kJ/m$^2$ in a Charpy notched test according to ISO 179-1eA:2000.

Preferably, in the matrix phase (A) according to the first embodiment, the amount of the homo/random/block copolymer is at least 75 wt. %, more preferably at least 85 wt. %, even more preferably at least 95 wt. %, even more preferably at least 99 wt. % and most preferably 100 wt. % based on the matrix phase (A).

In the first embodiment, preferably, the homo/random/block copolymer comprised in the matrix phase (A) has a content of component (A3) measured as xylene soluble fraction (XS) of up to 50 wt. %, more preferably of 5 to 40 wt. %, and most preferably of 15 to 30 wt. % based on the homo/random/block copolymer comprised in the matrix phase (A).

Further, in the first embodiment, preferably, the homo/random block copolymer comprised in the matrix phase (A) has a content of component (A1) of up to 75% more preferably, of 20 to 75 wt. % and most preferably of 30 to 65 wt. %, based on the homo/random block copolymer comprised in the matrix phase (A). In another preferred embodiment, the homo/random/block copolymer comprised in the matrix phase (A) has a content of component (A1) of up to 70%.

Further, in the first embodiment, preferably, the homo/random/block copolymer comprised in the matrix phase (A) has a content of component (A2) of up to 75 wt. %, more preferably of 20 to 75 wt. % and most preferably of 30 to 65 wt. %, based on the homo/random/block copolymer comprised in the matrix phase (A).

In the first embodiment, preferably, component (A1) has an MFR$_2$ from 0.2 to 20 g/10 min, more preferably from 0.8 to 10 g/10 min.

Further, in the first embodiment, preferably, component (A2) has an MFR$_2$ of 0.1 to 20 g/10 min, more preferably 0.5 to 15 g/10 min.

Further, in the first embodiment, preferably, component (A2) has a comonomer content of 2 to 20 wt. %, more preferably of 5 to 15 wt. % based on component (A2).

In the first embodiment, preferably, component (A3) has an ethylene content of 10 to 50 wt. %, more preferably of 20 to 40 wt. %, and most preferably of 25 to 35 wt. % based on component (A3).

Further, in the first embodiment, preferably, the intrinsic viscosity of component (A3) is from 0.1 to 5.0 dl/g, more preferably is from 0.5 to 4.0 dl/g and most preferably is from 1.0 to 3.0 dl/g, component (A3) being measured as xylene soluble fraction as described above.

In the first embodiment, preferably, component (A3) is dispersed within the homo/random/block copolymer comprised in the matrix phase (A), preferably in the form of particles, more preferably said particles have a weight average particle size of less than 5.0 μm, more preferably less than 2.5 μm and most preferably less than 1.0 μm. A suitable method for determining this weight average particle size is described in the paper "Characterization of Modified Polypropylene by Scanning Electron Microscopy" by Pölt P, Ingolic E, Gahleitner M, Bernreitner K, Geymayer W, *J. Appl. Polym. Sci.* 78 (2000) 1152 ff.

Further, in the first embodiment, preferably, the sum of the components (A1) and (A2) is from 65 to 95 wt. %, more preferably is from 70 to 85 wt. % based on the homo/random/block copolymer comprised in the matrix phase (A).

Further, in the first embodiment, preferably, the homo/random/block copolymer comprised in the matrix phase (A) has an $MFR_2$ of 0.1 to 40 g/10 min, more preferably of 0.2 to 20 g/10 min and most preferably of 0.5 to 10 g/10 min.

The homo/random/block copolymer comprised in the matrix phase (A) according to the first embodiment may be produced by single- or multistage process polymerisation of propylene or propylene and alpha-olefin and/or ethylene such as bulk polymerisation, gas phase polymerisation, slurry polymerisation, solution polymerisation or combinations thereof using conventional catalysts. The copolymer can be made either in loop reactors or in a combination of loop and gas phase reactors. Those processes are well known to one skilled in the art.

Preferably, the homo/random/block copolymer according to the first embodiment is produced in a multistage process, preferably said multistage process comprising at least the following three stages.

In the first polymerization stage the propylene homopolymer is produced in one loop reactor or a series of reactors comprising at least one loop reactor and one or more loop and/or gas phase reactors.

The product obtained in the first stage is transferred to the second polymerization stage wherein the propylene random copolymer is produced in one gas phase reactor or a series of gas phase reactors.

The product obtained in the second stage is transferred to the third polymerization stage wherein the ethylene-propylene rubber (EPR) is produced in one gas phase reactor or a series of gas phase reactors.

More preferably, each of the afore-mentioned stages is carried out in one reactor.

In case the homo/random/block copolymer according to the first embodiment is produced in a multistage process as described above, preferably the polymer obtained after the second stage has an $MFR_2$ from 0.1 to 10 g/10 min, more preferably from 0.5 to 5.0 g/min, further, preferably said polymer has a comonomer content from 0.5 to 20 wt. % and more preferably from 1.0 to 10 wt. % based on the polymer obtained after the second stage.

A suitable catalyst for the polymerization of the propylene polymer according to the first embodiment is any stereospecific catalyst for propylene polymerization which is capable of polymerizing and copolymerizing propylene and comonomers at a temperature of 40 to 110° C. and at a pressure from 10 to 100 bar. Ziegler Natta catalysts as well as metallocene catalysts are suitable catalysts.

Further, preferably the polypropylene composition according to the first embodiment has an impact strength at −20° C. of at least 2.1 $kJ/m^2$, more preferably of at least 2.5 $kJ/m^2$, even more preferably of at least 2.9 $kJ/m^2$, even more preferably of at least 3.2 $kJ/m^2$, even more preferably of at least 3.7 $kJ/m^2$, even more preferably of at least 4.2 $kJ/m^2$, even more preferably of at least 5.0 $kJ/m^2$ and most preferably of at least 5.5 $kJ/m^2$ in a Charpy notched test according to ISO 179-1eA: 2000.

The second embodiment of the present invention is a polypropylene composition comprising a matrix phase (A) comprising a propylene homo- or copolymer with an impact strength at +23° C. of at least 40.0 $kJ/m^2$, preferably of at least 45 $kJ/m^2$, even more preferably of at least 50 $kJ/m^2$, even more preferably of at least 55 $kJ/m^2$, even more preferably of at least 60 $kJ/m^2$, even more preferably of at least 65 $kJ/m^2$ even more preferably of at least 70 $kJ/m^2$, even more preferably of at least 75 $kJ/m^2$ and most preferably of 80 $kJ/m^2$ in a Charpy notched test according to ISO 179-1eA: 2000 and a polyolefin (B) dispersed in the matrix phase (A), which comprises hydrolysable silicon-containing groups.

Preferably, in the matrix phase (A) according to the second embodiment, the amount of the propylene homo- or copolymer is at least 75 wt. %, more preferably at least 85 wt. %, even more preferably at least 95 wt. %, even more preferably at least 99 wt % and most preferably 100 wt. % based on the matrix phase (A).

Preferably, in the second embodiment, the propylene homo- or copolymer comprised in the matrix phase (A) has an $MFR_2$ of 0.2 to 20 g/10 min, more preferably of 0.5 to 10 g/10 min.

Preferably, in the second embodiment, the propylene homo- or copolymer comprised in the matrix phase (A) is a propylene copolymer, more preferably is a heterophasic polypropylene composition (C) comprising a propylene homo- or random copolymer (D) and an alpha-olefin-propylene rubber (E) which is dispersed in the propylene homo- or random copolymer (D), more preferably component (E) is an ethylene-propylene rubber.

Preferably, in the second embodiment, the amount of (D) is from 55 to 98 wt. %, more preferably from 65 to 95 wt % and most preferably from 65 to 85 wt. % based on the heterophasic polypropylene composition (C).

Further, in the second embodiment, preferably the amount of (E) measured as xylene soluble fraction (XS) is from 2 to 45 wt. % more preferably from 5 to 35 wt. % and most preferably from 15 to 35 wt. % based on the heterophasic polypropylene composition (C).

Further, in the second embodiment, preferably component (D) is a propylene copolymer, more preferably component (D) is a propylene random copolymer with a comonomer content of 1 to 20 wt. %, preferably 2 to 10 wt. % based on component (D). In the second embodiment, preferably, component (D) has an $MFR_2$ of 0.1 to 20 g/10 min, more preferably 0.5 to 15 g/10 min.

In the second embodiment, preferably, component (E) is dispersed within the propylene homo- or random copolymer (D), preferably in the form of particles, more preferably said particles have a weight average particle size of less than 5.0 µm, even more preferably less than 2.5 µm and most preferably less than 1.0 µm. A suitable method for determining this weight average particle size is described in the aforementioned paper "Characterization of Modified Polypropylene by Scanning Electron Microscopy" by Pölt P, Ingolic E, Gahleitner M, Bernreitner K, Geymayer W, *J. Appl. Polym. Sci.* 78 (2000) 1152 ff.

In the second embodiment, preferably the intrinsic viscosity of the xylene soluble part of the heterophasic polypropylene composition (C) is from 0.1 to 5.0 dl/g, more preferably from 0.5 to 4.0 dl/g, and most preferably from 1.0 to 3.0 dl/g.

In the second embodiment, preferably the comonomer content of component (E) is from 27 to 57 wt. % more preferably from 37 to 47 wt. % based on component (E).

The propylene homo- or copolymer comprised in the matrix phase (A) according to the second embodiment may be produced by single- or multistage process polymerisation of propylene or propylene and alpha-olefin and/or ethylene such as bulk polymerisation, gas phase polymerisation, slurry polymerisation, solution polymerisation or combinations thereof using conventional catalysts. A copolymer can be made either in loop reactors or in a combination of loop and gas phase reactors. Those processes are well known to one skilled in the art.

Preferably the propylene homo- or copolymer comprised in the matrix phase (A) according to the second embodiment is produced in a combination of bulk slurry loop reactor(s) and gas phase reactor(s). Preferably, in case the propylene homo- or copolymer comprised in the matrix phase (A) is a heterophasic polypropylene composition (C) as described above, the propylene homo- or random copolymer (D) is produced in loop reactors or a combination of loop and gas phase reactor(s). The polymer (D) produced this way is transferred into another reactor and the alpha-olefin-propylene-rubber (E) is polymerized. Preferably the polymerization of component (E) is carried out in a gas phase reactor.

A suitable catalyst for the polymerization of the propylene polymer according to the second embodiment is any stereospecific catalyst for propylene polymerization which is capable of polymerizing and copolymerizing propylene and comonomers at a temperature of 40 to 110° C. and at a pressure from 10 to 100 bar. Ziegler Natta catalysts as well as metallocene catalysts are suitable catalysts.

The heterophasic polypropylene composition (C) may also be produced by mixing and melt blending a propylene homo- or copolymer (D) with an alpha-olefin-propylene rubber (E).

Further, preferably the polypropylene composition according to the second embodiment has an impact strength at −20° C. of at least 9 kJ/m$^2$, more preferably of at least 9.5 kJ/m$^2$, even more preferably of at least 10 kJ/m$^2$, even more preferably of at least 10.5 kJ/m$^2$, and most preferably of at least 11 kJ/m$^2$ in a Charpy notched test according to ISO 179-1eA: 2000.

In the following, preferred ways to carry out both the first and the second embodiment of the current invention are described.

Preferably the amount of matrix phase (A) is equal to or more than 80 wt. % based on the total polypropylene composition, more preferably is equal to or more than 85 wt. % based on the total polymer composition, even more preferably is from 88 to 99.5 wt. % based on the total polymer composition and most preferably is from 89 to 99 wt. % based on the total polymer composition.

Preferably, the used comonomers may be selected from but are not limited to ethylene and/or C$_4$- to C$_{20}$-alpha-olefins. However, ethylene and/or C$_4$- to C$_{20}$-alpha-olefins are preferred, even more preferred are ethylene and/or C$_4$- to C$_{15}$-alpha-olefins, even more preferred are ethylene and/or C$_4$- to C$_{10}$-alpha-olefins and most preferred are ethylene and/or C$_4$- to C$_6$-alpha-olefins.

Preferably, the amount of polyolefin (B) is up to 20 wt. %, more preferably is up to 15 wt. %, even more preferably is from 0.5 to 12 wt. % and most preferably is from 1 to 11 wt. % based on the total polymer composition.

Furthermore, in the first and the second embodiment polyolefin (B) is dispersed in the matrix phase (A) and comprises hydrolysable silicon-containing groups.

Preferably, the polyolefin (B) is crosslinked.

The hydrolysable silicon-containing groups can be introduced e.g. by grafting the silicon-containing compound into the polyolefin (variant I) or by copolymerisation of the olefin monomers and silicon groups containing monomers (variant II). Such techniques are known e.g. from U.S. Pat. No. 4,413,066, U.S. Pat. No. 4,297,310, U.S. Pat. No. 4,351,876, U.S. Pat. No. 4,397,981, U.S. Pat. No. 4,446,283 and U.S. Pat. No. 4,456,704.

In the case the silicon group containing polyolefin (B) has been obtained by copolymerisation, i.e. variant II, the copolymerisation is preferably carried out with an unsaturated silicon-containing compound represented by the formula

$$R^1 SiR^2_q Y_{3-q} \quad (I)$$

wherein
R$^1$ is an ethylenically unsaturated hydrocarbyl, hydrocarbyloxy or (meth)acryloxy hydrocarbyl group,
R$^2$ is an aliphatic saturated hydrocarbyl group,
Y which may be the same or different, is a hydrolysable organic group and
q is 0, 1 or 2.

Special examples of the unsaturated silicon-containing compound are those wherein R$^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and R$^2$, if present, is a methyl, ethyl, propyl, decyl or phenyl group.

A preferred unsaturated silicon-containing compound is represented by the formula

$$CH_2=CHSi(OA)_3 \quad (II)$$

wherein A is a hydrocarbyl group having 1-8 carbon atoms, preferably 1-4 carbon atoms.

The most preferred compounds are vinyl trimethoxysilane, vinyl bismethoxyethoxysilane, vinyl triethoxysilane, gamma-(meth)acryloxypropyl-trimethoxysilane, gamma (meth)acryloxypropyltriethoxysilane, and vinyl triacetoxysilane.

The copolymerisation of the olefin and the unsaturated silicon-containing compound may be carried out under any suitable conditions resulting in the copolymerisation of the two monomers.

Moreover, the copolymerisation may be implemented in the presence of one or more other comonomers which can be copolymerised with the two monomers. Such comonomers include (a) vinyl carboxylate esters, such as vinyl acetate and vinyl pivalate, (b) alpha-olefins, such as propene, 1-butene, 1-hexane, 1-octene and 4-methyl-1-pentene, (c) (meth)acrylates, such as methyl(meth)acrylate, ethyl(meth)acrylate and butyl(meth)acrylate, (d) olefinically unsaturated carboxylic acids, such as (meth)acrylic acid, maleic acid and fumaric acid, (e) (meth)acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-ethyl styrene.

Amongst these comonomers, vinyl esters of monocarboxylic acids having 1-4 carbon atoms, such as vinyl acetate, and (meth)acrylate of alcohols having 1-4 carbon atoms, such as methyl(meth)-acrylate, are preferred.

Especially preferred comonomers are butyl acrylate, ethyl acrylate and methyl acrylate.

Two or more such olefinically unsaturated compounds may be used in combination. The term "(meth)acrylic acid" is intended to embrace both acrylic acid and methacrylic acid. The comonomer content of the copolymer may amount to 70 wt % of the copolymer, preferably about 0.5 to 35 wt %, most preferably about 1 to 30 wt %.

If the silicon-containing groups are introduced in the polyolefin (B) by polymerisation, (variant II as described above), it is preferred that the silicon group containing polyolefin (B) has a density of 900 to 940 kg/m$^3$, more preferred of 910 to 935 kg/m$^3$, most preferred of 915 to 930 kg/m$^3$.

Preferably, component (B) is an ethylene copolymer.

Preferably, component (B) has an ethylene content of at least 30 wt. %, more preferably from 65 to 99.5 wt. % and most preferably from 70 to 99 wt. %.

The grafted polyolefin (variant I) may be produced e.g. by any of the two methods described in U.S. Pat. No. 3,646,155 and U.S. Pat. No. 4,117,195, respectively.

The silicon-group containing polyolefin (B) according to the invention preferably comprises 0.1 to 10.0 wt % of the silicon-containing compound, more preferably 0.5 to 7.0 wt %, even more preferably 1.0 to 4.0 wt % based on the total polyolefin (B).

The silanol content can be adjusted by blending the grafted or copolymerised polyolefin with a non-modified polyolefin.

Furthermore, it is preferred that the silicon-grafted polyolefin (B1) has a density of 920 to 960 kg/m', more preferred of 925 to 955 kg/m', most preferred of 930 to 950 kg/m'.

Moreover, preferably an ethylene homo- or copolymer, such as a high density polyethylene, low density polyethylene, linear low density polyethylene or the like is used for the production of the grafted polyolefin (variant I), preferably an ethylene homopolymer is used.

The polypropylene composition according to the present invention preferably comprises a silanol condensation catalyst capable of cross-linking the hydrolysable silicon group containing polyolefin (B). Thus, the cross-linking reaction may be preferably carried out at a temperature of not more than 40° C., more preferably not more than 30° C., even more preferred at about room temperature. The cross-linking reaction may but need not be conducted in the presence of moisture.

The cross-linking reaction may preferably be carried out by any known silanol condensation catalyst. Conventional catalysts are for example tin-organic compounds such as dibutyl tin dilaurate (DBTDL) and dioctyl-tin-dilaurat (DOTL). It is further known that the cross-linking process advantageously is carried out in the presence of acidic silanol condensation catalysts. In contrast to the conventional tin-organic catalysts the acidic catalysts allow cross-linking to quickly take place already at room temperature. Such acidic silanol condensation catalysts are disclosed for example in WO 95/17463. The contents of this document is enclosed herein by reference.

It is preferred that the acidic silanol condensation catalyst is typically selected from the group comprising Lewis acids, inorganic acids such as sulphuric acid and hydrochloric acid, and organic acids such as citric acid, stearic acid, acetic acid, sulfonic acid and alkanoic acids as dodecanoic acid, organic bases, carboxylic acids and organometallic compounds including organic titanates and complexes or carboxylates of lead, cobalt, iron, nickel, zinc and tin or a precursor of any of the compounds mentioned.

Further preferred, the aromatic organic sulfonic acid comprises the structural element:

$$Ar(SO_3H)_x \qquad (III)$$

with Ar being an aryl group which may be substituted or non-substituted, and x being at least 1.

The organic aromatic sulfonic acid silanol condensation catalyst may comprise the structural unit according to formula (III) one or several times, e.g. two or three times. For example, two structural units according to formula (III) may be linked to each other via a bridging group such as an alkylene group.

Preferably, Ar is a aryl group which is substituted with at least one $C_4$- to $C_{30}$-hydrocarbyl group, more preferably $C_4$- to $C_{30}$-alkyl group.

Aryl group Ar preferably is a phenyl group, a naphthalene group or an aromatic group comprising three fused rings such as phenantrene and anthracene.

Preferably, in formula (III) x is 1, 2 or 3, and more preferably x is 1 or 2.

Furthermore, preferably the compound used as organic aromatic sulfonic acid silanol condensation catalyst has from 10 to 200 C-atoms, more preferably from 14 to 100 C-atoms.

In one preferred embodiment, Ar is a hydrocarbyl substituted aryl group and the total compound containing 14 to 28 carbon atoms, and still further preferred, the Ar group is a hydrocarbyl substituted benzene or naphthalene ring, the hydrocarbyl radical or radicals containing 8 to 20 carbon atoms in the benzene case and 4 to 18 atoms in the naphthalene case.

It is further preferred that the hydrocarbyl radical is an alkyl substituent having 10 to 18 carbon atoms and still more preferred that the alkyl substituent contains 12 carbon atoms and is selected from dodecyl and tetrapropyl. Due to commercial availability it is most preferred that the aryl group is a benzene substituted group with an alkyl substituent containing 12 carbon atoms.

The currently most preferred compounds are dodecyl benzene sulfonic acid and tetrapropyl benzene sulfonic acid.

The silanol condensation catalyst may also be precursor of the sulfonic acid compound, including all its preferred embodiments mentioned, i.e. a compound that is converted by hydrolysis to such a compound. Such a precursor is for example the acid anhydride of a sulfonic acid compound, or a sulfonic acid that has been provided with a hydrolysable protective group, as e.g. an acetyl group, which can be removed by hydrolysis.

In a second preferred embodiment, the sulfonic acid catalyst is selected from those as described in EP 1 309 631 and EP 1 309 632, namely a) a compound selected from the group of (i) an alkylated naphthalene monosulfonic acid substituted with 1 to 4 alkyl groups wherein each alkyl group is a linear or branched alkyl with 5 to 40 carbons with each alkyl group being the same or different and wherein the total number of carbons in the alkyl groups is in the range of 20 to 80 carbons;

(ii) an arylalkyl sulfonic acid wherein the aryl is phenyl or naphthyl and is substituted with 1 to 4 alkyl groups wherein each alkyl group is a linear or branched alkyl with 5 to 40 carbons with each alkyl group being the same or different and wherein the total number of carbons in the alkyl groups is in the range of 12 to 80;

(iii) a derivative of (i) or (ii) selected from the group consisting of an anhydride, an ester, an acetylate, an epoxy blocked ester and an amine salt thereof which is hydrolysable to the corresponding alkyl naphthalene monosulfonic acid or the arylalkyl sulfonic acid;
(iv) a metal salt of (i) or (ii) wherein the metal ion is selected from the group consisting of copper, aluminium, tin and zinc; and
b) a compound selected from the group of
(i) an alkylated aryl disulfonic acid selected from the group consisting of the structure (IV):

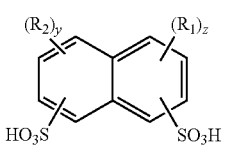

and the structure (V):

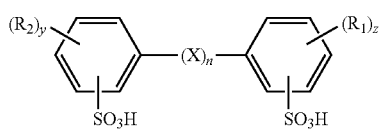

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_2$)($R_4$)—, wherein each of $R_3$ and $R_4$ is H or independently a linear or branched alkyl group of 1 to 4 carbons and n is 1; —C(=O)—, wherein n is 1; —S—, wherein n is 1 to 3 and —S(O)$_2$—, wherein n is 1; and
(ii) a derivative of (i) selected from the group consisting of the anhydrides, esters, epoxy blocked sulfonic acid esters, acetylates, and amine salts thereof which is a hydrolysable to the alkylated aryl disulfonic acid, together with all preferred embodiments of those sulfonic acids as described in the mentioned European Patents.

Furthermore, it is preferred that the silanol condensation catalyst is preferably present in an amount of 0.0001 to 6.0 wt %, more preferably of 0.001 to 2.0 wt %, and most preferably 0.02 to 0.5 wt %. It may also be used in an amount of from 0.05 to 1.0 wt % based on the polyolefin (B).

Preferably, the cross-linkable polyolefin (B) comprises, still more preferably consists of, a polyethylene containing hydrolysable silicon-containing groups. It is also preferred that the amount of the silicon-containing groups is from 0.1 to about 50 wt. %, based on the total polyolefin (B).

Preferably, the cross-linking of polypropylene composition is carried out at 10 to 40° C. under a humidity of below 85% to a cross-linking degree of at least 30%, based on the total polyolefin (B).

The cross-linking degree is determined via the xylene hot insolubles fraction of the heterophasic polypropylene composition, and is more than 30%, more preferably more than 40%, of the total content of the polyolefin (B).

Preferably the polypropylene composition has an increase of at least 35% in impact strength at −20° C. in a Charpy notched test according to ISO 179-1eA:2000 compared with its matrix polymer (A), provided that the matrix polymer (A) has an impact strength at −20° C. of equal to or below 5 kJ/m² in a Charpy notched test according to ISO 179-1eA:2000.

Further, preferably the polypropylene composition has an increase of at least 25% in impact strength at −20° C. in a Charpy notched test according to ISO 179-1eA:2000 compared with its matrix polymer (A), provided that the matrix polymer (A) has an impact strength at −20° C. of higher than 5 kJ/m² in a Charpy notched test according to ISO 179-1eA:2000.

Further, preferably, the polypropylene composition has a tensile modulus of 650 MPa or less, more preferably of 600 MPa or less, even more preferably of 550 MPa or less and most preferably of 500 MPa or less.

Preferably, the temperature of the wire in the Hot Wire Deformation Test (HWT, as described in the experimental section) upon contact is more than 190° C., more preferably equal to or higher than 195° C., even more preferably equal to or higher than 200° C., even more preferably equal to or higher than 205° C. and most preferably equal to or more than 215° C.

Further, preferably, the time to contact in the Hot Wire Deformation Test (HWT, as described in the experimental section) is more than 28 seconds, more preferably equal to or higher than 29 seconds, even more preferably equal to or higher than 30 seconds, even more preferably equal to or higher than 30 seconds and most preferably equal to or higher than 31 seconds.

The invention is furthermore directed to a method for the production of a polypropylene composition as described in any of the above embodiments
wherein the process comprises the following steps
  i. blending (A) and (B), which comprises hydrolysable silicon-containing groups, together with a silanol condensation catalyst,
  ii. preferably granulation of the blend of step (i) in a water bath, and/or
  iii. preferably cross-linking the polypropylene composition at 10 to 40° C. under a humidity of below 85% to a cross-linking degree of at least 30%, based on the total polyolefin (B).

Moreover, the polypropylene composition according to the invention may further contain various additives, such as miscible thermoplastics, further stabilizers, lubricants, fillers, colouring agents and foaming agents, which can be added before during or after the blending step (i) to the composition. The amount of said additives is usually below 10 wt. %, preferably below 7 wt. %, more preferably below 3 wt. % and most preferably below 1 wt. % based on the total polypropylene composition.

The polypropylene composition according to the present invention can be used in many and diverse applications and products.

As already mentioned the polypropylene composition according to the present invention is particularly preferred used for wires/cables, pipes and tubes.

The invention is furthermore directed to an article comprising polypropylene composition according to the present invention. Preferred articles are wires/cables, pipes and tubes.

It will be shown in the example section below that the reinforced polyolefin compositions according to the present invention show highly improved mechanical properties such as Charpy notched impact strength accompanied by good properties for tensile modulus, tensile strain at break and hot wire deformation (HWT).

The invention is further illustrated by the following examples by reference to FIG. 1.

FIG. 1 shows a schematic drawing of the assembly of the Hot Wire Deformation Test (HWT) as described below.

DEFINITIONS a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg, the $MFR_5$ of polyethylene is measured at a temperature 190° C. and a bad of 5 kg and the $MFR_2$ of polyethylene at a temperature 190° C. and a load of 2.16 kg.

b) Xylene Insolubles (Determination of Cross-Linking Degree)

The content of xylene hot insolubles is determined by extracting 1 g of finely cut polymer sample with 500 ml xylene in a Soxleth extractor for 48 hours at the boiling temperature. The remaining solid amount is dried at 90° C. and weighed for determining the insolubles amount.

c) Charpy Notched Impact Test

Charpy impact strength was determined according to ISO 179-1eA:2000 on V-notched samples having a size of $80 \times 10 \times 4$ mm³ at 23° C. (Charpy impact strength (23° C.)) and −20° C. (Charpy impact strength (−20° C.)). The base radius was 0.25 mm.

The test specimens were prepared by injection moulding according to ISO 1873-2.

d) Tensile Test

Tensile tests are performed according to ISO 527-2 using injection moulded specimen as described in EN ISO 1873-2 (dog bone shape, 4 mm thickness).

Tensile modulus (E-modulus) was also determined according to ISO 527-2 and calculated from the linear part of the tensile test results.

Strain at Yield:

Strain at yield (in %) was determined according to ISO 527-2. The measurement was conducted at 23° C. temperature with an elongation rate of 50 mm/min.

Stress at Yield:

Stress at yield (in MPa) was determined according to ISO 527-2. The measurement was conducted at 23° C. temperature with an elongation rate of 50 mm/min.

Tensile Modulus

Tensile modulus (in MPa) was determined according to ISO 527-2. The measurement was conducted at 23° C. temperature with an elongation rate of 1 mm/min.

Tensile Break:

Tensile break was determined according to ISO 527-2. The measurement was conducted at 23° C. temperature with an elongation rate of 50 mm/min.

f) Density

Density of the polymer was measured according to ISO 1183/D on compression moulded specimens g) Xylene Soluble:

Determination of Xylene Soluble Fraction (XS):

2.0 g of polymer is dissolved in 250 ml p-xylene at 135° C. under agitation. After 30 minutes the solution is allowed to cool for 15 minutes at ambient temperature and then allowed to settle for 30 minutes at 25° C. The solution is filtered with filter paper into two 100 ml flasks.

The solution from the first 100 ml vessel is evaporated in nitrogen flow and the residue is dried under vacuum at 90° C. until constant weight is reached.

XS $\% = (100 \times m \times V_o)/(m_o \times v)$; $m_o$=initial polymer amount (g); m=weight of residue (g); $V_o$=initial volume (ml); v=volume of analysed sample (ml).

h) Intrinsic Viscosity (IV)

This was measured according to DIN ISO 1628/1, October 1999 in decalin at 135° C.

i) Hot Wire Deformation Test (HWT)

This test is performed to demonstrate the resistance of a cable material to short heat load situations similar to the short circuit test of standard in IEC811-3-1. Instead of using a complete insulated cable as in said test, a copper conductor with 1.5 mm² cross section area and 210 mm length (1) is used in combination with a compression moulded plate of the insulation material (2). The conductor is mounted in between two supports and connected to a direct current (DC) welding generator (4) (see FIG. 1), all kept initially at ambient temperature (+23° C.). When a current of 75 A is applied, the temperature on the conductor increases 60° C. every 10 sec during the first minute of the test, verified by measuring the temperature with a thermocouple (5) attached to the conductor.

The insulation material (polymer) is compression moulded into a plate of 1.25 mm thickness, from which square specimen of $20 \times 20$ mm are cut and placed between the conductor and the same knife setup (6) as in IEC811-3-1, which knife setup is loaded with 121 g (3), calculated from the thickness of insulation in IEC811-3-1. The angle between knife blade and conductor is set to 90°. To register when the knife gets in contact with the conductor, a control circuit (7) between the conductor and the knife is set up to indicate this contact with a beep signal.

For performing the actual test, the DC welding generator is started simultaneously with a timer of a precision better than 1 second. Both time and temperature of the beep signal, i.e. the penetration of the knife through the insulation material, are noted. To improve the precision, five repetitions of the test are performed for each type of material and an arithmetical average for both time and temperature is calculated.

In practice, two main averages over the Heat shock test according to IEC811-3-1 have been identified, namely the fact that it is a more realistic test for cable applications since heat is generated at the conductor in contact with the testing probe and that the failure of insulation is identified via a realistic temperature ramp.

A scheme of the HWT test is shown is FIG. 1.

EXAMPLES

1. Materials

Compounds:

Silicon Group Containing Polymer: (Example for Component (B) in the First and the Second Embodiment)

High-pressure low density ethylene terpolymer (LE4481) with a vinyltrimethylsilane content of 1.75 wt % and a butylacrylate content of about 17 wt % for cable insulation with an $MFR_2$ (190° C./2.16 kg) of 5 g/10 min, and a density of 927 kg/m³, distributed by Borealis Polyolefine GmbH.

Propylene Polymer 1 (PP1) (Example for the Matrix Phase (A) in the First Embodiment)

Polypropylene base resin PP1 is a homo-random-heterophasic polypropylene copolymer composition produced in a multistage polymerization process consisting of a loop and two gas phase reactors using a conventional heterogeneous Ziegler-Natta catalyst system consisting of an $MgCl_2$-supported $TiCl_4$ catalyst with internal electron donor, triethylaluminium as co-catalyst and an organosilane as external electron donor, as known in the art. In the loop reactor, a propylene homopolymer with an MFR$_2$ of 7.6 g/10 min was produced. The product was transferred to the first gas phase reactor, wherein an equal amount of propylene-ethylene random copolymer was produced, resulting in an ethylene content of 4.2 wt. % and an MFR$_2$ of 2.8 g/10 min of the polymer produced in these two reactors. This product was in turn transferred to the second gas phase reactor, wherein the elastomeric ethylene-propylene-copolymer was synthesized. The final composition had an MFR$_2$ of 3.5 g/10 min, the xylene solubles content was 27.5 wt. % and the intrinsic viscosity of the xylene solubles was 1.4 dl/g.

Propylene Polymer 2 (PP2) (Example for the Matrix Phase (A) in the Second Embodiment)

Polypropylene base resin PP2 is a random-heterophasic polypropylene copolymer composition produced in a multi-stage polymerization process consisting of a loop and a gas phase reactor using a conventional heterogeneous Ziegler-Natta catalyst system consisting of an MgCl$_2$-supported TiCl$_4$ catalyst with internal electron donor, triethylaluminium as co-catalyst and an organosilane as external electron donor, as known in the art. In the loop reactor, a propylene-ethylene random copolymer with an ethylene content of 4.0 wt. % and an MFR$_2$ of 0.9 g/10 min was produced. The polymer was transferred to the gas phase reactor, wherein the elastomeric ethylene-propylene-copolymer was synthesized. The final composition had an MFR$_2$ of 0.5 g/10 min, a XS value of 27.5 wt. % and the intrinsic viscosity of the xylene soluble part was 2.5 dl/g. The ethylene content of the xylene soluble part was 42 wt. %. The total ethylene content in the composition was 15.5 wt. %.

Catalyst Masterbatch CAT-MB50:

CAT-MB50 with dibutyltin dilaurate as catalytically active substance distributed by Borealis.

Production of EBA and EMA Used in Comparative Examples 10 & 11

The copolymerization has been run as a continuous process in an autoclave. Ethylene, and methyl acrylate or butyl acrylate, are fed continuously into a stirred autoclave of the type disclosed in U.S. Pat. No. 2,897,183, together with an initiator. The reaction mixture has been continuously removed from the autoclave. After the reaction mixture leaves the reaction vessel, the copolymer has been separated from the unreacted monomers by vaporizing the non-polymerized materials under reduced pressure and at an elevated temperature.

Compounding of Compositions

The components as listed for each example and comparative example, were combined in a twin screw extruder (PRISM TSE24, L/D ratio 40) with two high intensity mixing segments at temperatures between 190 and 220° C. at a throughput of 10 kg/h and a screw speed of 50 rpm. The material was extruded to two circular dies of 3 mm diameter into water base with a residence time of at least 30 sec for solidifying the melt strand, which was consequently granulated. For the period until melt processing, the resulting compound was stored at an ambient temperature of +23±2° C. and normal humidity (50±5%).

Comparative Example 1

94.65 wt. % PP random copolymer with 4.5 wt. % C$_2$-content and MFR$_2$ of 8 g/10 min (RD208CF, distributed by Borealis), 5 wt. % silicon group containing polymer (LE4481), 0.25 wt. % CAT-MB50 and 0.1 wt. % of Irganox 8225 (distributed by Ciba).

Comparative Example 2

99.9 wt. % of PP 1 and 0.1 wt. % of Irganox 8225 (distributed by Ciba).

Example 3

98.9 wt. % of PP 1 as matrix phase is used together with 0.95 wt. % of silicon-group containing polymer (LE4481), 0.05 wt. % catalyst masterbatch CAT-MB50 and 0.1 wt. % of Irganox B225 (distributed by Ciba).

Example 4

97.9 wt. % of PP 1 as matrix phase is used together with 2 wt. % of silicon group containing polymer (LE4481) and 0.1 wt. % of Irganox B225 (distributed by Ciba).

Example 5

97.9 wt. % of PP 1 as matrix phase is used together with 1.9 wt. % of silicon-group containing polymer (LE4481), 0.1 wt. % catalyst masterbatch CAT-MB50 and 0.1 wt. % of Irganox 8225 (distributed by Ciba).

Example 6

94.9 wt. % of PP 1 as matrix phase is used together with 5 wt. % of silicon group containing polymer (LE4481) and 0.1 wt. % of Irganox B225 (distributed by Ciba).

Example 7

94.9 wt. % of PP 1 as matrix phase is used together with 4.75 wt. % of silicon-group containing polymer (LE4481), 0.25 wt. % catalyst masterbatch CAT-MB50 and 0.1 wt. % of Irganox B225 (distributed by Ciba).

Example 8

89.9 wt. % of PP 1 as matrix phase is used together with 9.5 wt. % of silicon-group containing polymer (LE4481), 0.5 wt. % catalyst masterbatch CAT-MB50 and 0.1 wt. % of Irganox 8225 (distributed by Ciba).

TABLE 1

|  | Unit | CE 1 | CE 2 | Ex. 3 | Ex 4 | Ex. 5 | Ex 6 | Ex. 7 | Ex. 8 |
|---|---|---|---|---|---|---|---|---|---|
| Tensile Modulus | MPa | 665 | 465 | 499 | 455 | 476 | 445 | 443 | 420 |
| Tensile stress at yield | MPa | 20.5 | 15.1 | 15.6 | 15.1 | 15.5 | 14.9 | 14.5 | 14 |
| Tensile strain at yield | % | 13.7 | 16.9 | 16.7 | 17 | 17.1 | 17.4 | 18 | 19.3 |
| Tensile strength | MPa | n.a. | 20.2 | 20.1 | 20 | 20 | 20.3 | 20.4 | 20.7 |
| Tensile strain at tensile stress | % | n.a. | 495 | 477 | 485 | 482 | 510 | 499 | 536 |
| Tensile stress at break | MPa | 26 | 19.9 | 19.8 | 19.8 | 19.7 | 20 | 20.3 | 20.6 |
| Tensile strain at break | % | 582 | 500 | 482 | 490 | 488 | 516 | 503 | 537 |

TABLE 1-continued

|  | Unit | CE 1 | CE 2 | Ex. 3 | Ex 4 | Ex. 5 | Ex 6 | Ex. 7 | Ex. 8 |
|---|---|---|---|---|---|---|---|---|---|
| Impact strength at 23° C. | kJ/m² | 8.2 | 61 | 65 | 63 | 64 | 70 | 70 | 78 |
| Type of failure | — | c.b. | p.b. | p.b. | p.b. | p.b. | p.b. | p.b. | p.b. |
| Impact strength at −20° C. | kJ/m² | 1.9 | 2.0 | 2.9 | 2.7 | 3.2 | 3.5 | 4.2 | 5.5 |
| Type of failure | — | c.b. | c.b. | c.b. | c.b. | c.b. | c.b. | c.b. | c.b. | p.b partial break;
c.b. complete break;
n.a. not applicable

Comparative Example 9

99.9 wt. % of PP2 and 0.1 wt % of Irganox B225 (distributed by Ciba).

Comparative Example 10

89.9 wt. % of PP2 as matrix phase is used together with 10 wt. % of an ethylene-butylacrylate copolymer (EBA) with a butyl acrylate content of 17 wt. %, a density of 924 kg/m³ and an MFR$_2$ (190° C. & 2.16 kg) of 1.5 g/10 min and 0.1 wt. % of Irganox 8225 (distributed by Ciba).

Comparative Example 11

89.9 wt. % of PP2 as matrix phase is used together with 10 wt. % of an ethylene-methylacrylate copolymer (EMA) with a methylacrylate content of 20 wt. %, a density of 942 kg/m³ and an MFR$_2$ (190° C. & 2.16 kg) of 8 g/10 min and 0.1 wt. % of Irganox B225 (distributed by Ciba).

Example 12

89.9 wt. % PP2 as matrix phase is used together with 10 wt. % of the silicon group containing polymer (LE4481) and 0.1 wt. % of Irganox 8225 (distributed by Ciba).

Example 13

89.4 wt. % PP2 as matrix phase is used together with 10 wt. % of silicon group containing polymer (LE4481) and 0.5 wt. % of CAT-MB50 and 0.1 wt. % of Irganox B225 (distributed by Ciba).

TABLE 2

|  | Unit | CE 9 | CE 10 | CE 11 | Ex. 12 | Ex 13 |
|---|---|---|---|---|---|---|
| Tensile Modulus | MPa | 465 | 421 | 404 | 402 | 410 |
| Tensile strain at break | % | 452 | 626 | 527 | 745 | 700 |
| Impact strength at 23° C. | kJ/m² | 94 | 83 | 84 | 89 | 87 |
| Impact strength at −20° C. | kJ/m² | 8 | 10 | 9 | 11 | 12 |
| Temperature to contact (HWT) | [° C.] | 155 | 183 | 187 | 220 | 207 |
| Time to contact (HWT) | [sec] | 28 | 28 | 28 | 33 | 31 |

The invention claimed is:

1. A polypropylene composition having a tensile modulus of 650 MPa or less measured at 23° C. with an elongation of 1 mm/min according to ISO 527-2 and a temperature upon contact, measured according to a Hot Wire Deformation Test, of more than 190° C. or a time to contact, measured according to the Hot Wire Deformation Test, of more than 29 seconds, comprising:

a propylene copolymer as matrix phase (A) comprising a homo/random/block copolymer, having an impact strength at +23° C. of at least 40.0 kJ/m² in a Charpy notched test according to ISO 179-1eA:2000, consisting of:
  a. a propylene homopolymer (A1);
  b. a propylene random copolymer (A2); and
  c. an ethylene-propylene rubber (EPR) (A3) having an ethylene content of 20 to 40 wt. % based on component (A3); and
a polyolefin (B) dispersed in the matrix phase (A), which comprises hydrolysable silicon-containing groups, wherein polyolefin (B) is present in an amount up to 20 wt % based on the total polypropylene composition.

2. A polypropylene composition having a temperature upon contact, measured according to a Hot Wire Deformation Test, of more than 190° C. or a time to contact, measured according to the Hot Wire Deformation Test, of more than 29 seconds, comprising:

a matrix phase (A) comprising a heterophasic polypropylene composition (C) with an impact strength at +23° C. of at least 40.0 kJ/m² in a Charpy notched test according to ISO 179-1eA:2000, wherein the heterophasic polypropylene composition (C) comprises a propylene homo- or random copolymer (D) an ethlyene propylene rubber (E) having a comonomer content of 27 to 57 wt. % based on component (E);
and
a polyolefin (B) dispersed in the matrix phase (A), which comprises hydrolysable silicon-containing groups, wherein polyolefin (B) is present in an amount up to 20 wt. % based on the total polypropylene composition.

3. The polypropylene composition according to claim 1, wherein the propylene homo/random/block copolymer comprised in the matrix phase (A) has a content of component (A3) of up to 50 wt. % based on the propylene homo/random/block copolymer comprised in the matrix phase (A).

4. The polypropylene composition according to claim 1, wherein the propylene homo/random/block copolymer comprised in the matrix phase (A) has a content of component (A1) of up to 70 wt. % based on the propylene homo/random/block copolymer comprised in the matrix phase (A).

5. The polypropylene composition according to claim 1, wherein the propylene homo/random/block copolymer comprised in the matrix phase (A) has a content of component (A2) of up to 75 wt. % based on the propylene homo/random/block copolymer comprised in the matrix phase (A).

6. The polypropylene composition according to claim 1, wherein the amount of component (A) is equal to or more than 80 wt. % based on the polypropylene composition.

7. The polypropylene composition according to claim 1, wherein polyolefin (B) further comprises a silanol condensation catalyst.

8. The polypropylene composition according to claim 1, wherein the amount of the silicon-containing groups is from 0.1 to about 50 wt. %, based on the total polyolefin (B).

9. The polypropylene composition according to claim 1, wherein the composition has an impact strength at +23° C. of at least 45 kJ/m² and at −20° C. of at least 2.2 kJ/m² in a Charpy notched test according to ISO 179-1eA:2000.

10. A method for the production of a polypropylene composition having a temperature upon contact, measured according to a Hot Wire Deformation Test, of more than 190° C. or a time to contact, measured according to the Hot Wire Deformation Test, of more than 29 seconds, comprising:
  a propylene copolymer as matrix phase (A); and
  a polyolefin (B) dispersed in the matrix phase (A) which comprises hydrolysable silane-groups, wherein polyolefin (B) is present in an amount up to 20 wt. % based on the total polypropylene composition;
wherein the matrix phase (A) has an impact strength at 23° C. of at least 40.0 kJ/m² in a Charpy notched test according to ISO 179-1eA:2000;
  and is a propylene copolymer comprising:
    a. a propylene homopolymer;
    b. a propylene random copolymer; and
    c. an ethylene-propylene rubber (EPR) having an ethylene content of 20 to 40 wt. % based on component (A3);
  wherein the process comprises the following step;
    i. blending (A) and (B), which comprises hydrolysable saline groups, optionally together with a silanol condensation catalyst.

11. An article comprising the polypropylene composition according to claim 1.

12. The polypropylene composition according to claim 2, wherein the amount of component (A) is equal to or more than 80 wt. % based on the polypropylene composition.

13. The polypropylene composition according to claim 2, wherein polyolefin (B) further comprises a silanol condensation catalyst.

14. The polypropylene composition according to claim 2, wherein the amount of the silicon-containing groups is from 0.1 to about 50 wt. %, based on the total polyolefin (B).

15. The polypropylene composition according to claim 2, wherein the composition has an impact strength at +23° C. of at least 45 kJ/m² and at −20° C. of at least 2.2 kJ/m² in a Charpy notched test according to ISO 179-1eA:2000.

16. An article comprising the polypropylene composition according to claim 2.

* * * * *